UNITED STATES PATENT OFFICE.

JAMES H. INGOLDSBY, OF COUNCIL BLUFFS, IOWA; ANNA INGOLDSBY ADMINISTRATRIX OF SAID JAMES H. INGOLDSBY, DECEASED.

COMPOSITION FOR MAKING FLOOR TILING, ETC.

1,403,786.   Specification of Letters Patent.   Patented Jan. 17, 1922.

No Drawing.   Application filed September 16, 1920.   Serial No. 410,645.

*To all whom it may concern:*

Be it known that I, JAMES H. INGOLDSBY, a citizen of the United States, residing at Council Bluffs, in the county of Pottawattamie and State of Iowa, have invented a certain new and useful Composition for Making Floor Tiling, &c., of which the following is a specification.

This invention relates to an improved composition particularly adapted or utilizable for making articles which are constituted of light material, among which may be mentioned floor-tiling, picture frames (one-piece), row boats, and various other articles.

This invention has for its object to commercialize a substance heretofore unutilized, especially the shells of the cocoanut for the purposes aforesaid, thereby economizing manufacture and promoting the industries along certain lines.

A further object is to provide for the carrying out of these ends or purposes in a simple, inexpensive and effective manner.

The invention therefore consists of the compounding certain ingredients in the manner and about the proportions substantially as hereinafter more fully disclosed and defined in the appended claim.

In carrying out my invention, I take litharge (a drier) about one-fourth ($\frac{1}{4}$) of a pound, whiting, about one-half ($\frac{1}{2}$) pound, and boiled linseed oil, about one-fourth ($\frac{1}{4}$) or two-thirds ($\frac{2}{3}$) pint and mix or compound the same with the cocoanut shells, which are ground finely, the same finally assuming the appearance of damp earth.

The resultant product or compound is characteristic of not requiring the admixture of much oil therewith, nor a heating action to dry it, therefore, is highly economical and simple of manufacture. It is further commercially valuable, as already indicated, for its lightness, therefore, being utilizable for many of the industrial arts or purposes.

It is believed that from the foregoing, the merits and advantages of my invention will be readily appreciable, and recommend its use to all builders and manufacturers along the lines wherein it may be called for.

I claim and desire to secure by Letters Patent:—

A composition for making floor-tiling, &c., compounded of one fourth of a pound of litharge, a half pound of whiting, one fourth to two thirds of a pint of boiled linseed oil and finely-ground cocoanut shells.

In testimony whereof, I affix my signature in the presence of two witnesses.

JAMES H. INGOLDSBY.

Witnesses:
ELIZABETH McGINN,
SIMON McGINN.